United States Patent
Vainio et al.

(10) Patent No.: US 7,495,585 B2
(45) Date of Patent: Feb. 24, 2009

(54) METHOD FOR INPUTTING CHARACTERS IN ELECTRONIC DEVICE

(75) Inventors: Janne Vainio, Pirkkala (FI); Hannu J. Mikkola, Tampere (FI); Hannu Korhonen, Tampere (FI); Sakari Himanen, Tampere (FI); Toni P. Nieminen, Lempaala (FI); Tuomas Vaittinen, Helsinki (FI); Juha Marila, Harjavalta (FI)

(73) Assignee: Nokia Corporation, Espoo (FI)

( * ) Notice: Subject to any disclaimer, the term of this patent is extended or adjusted under 35 U.S.C. 154(b) by 267 days.

(21) Appl. No.: 11/433,090

(22) Filed: May 12, 2006

(65) Prior Publication Data

US 2006/0267931 A1    Nov. 30, 2006

(30) Foreign Application Priority Data

May 13, 2005   (WO) ................. PCT/FI2005/050158

(51) Int. Cl.
*H03M 1/22* (2006.01)
(52) U.S. Cl. ..................... 341/34; 341/22; 345/169; 400/87; 400/477
(58) Field of Classification Search ............... 341/22, 341/34; 345/169; 400/87, 477
See application file for complete search history.

(56) References Cited

U.S. PATENT DOCUMENTS

| | | | |
|---|---|---|---|
| 4,870,686 A | | 9/1989 | Gerson et al. |
| 5,095,503 A | | 3/1992 | Kowalski |
| 5,311,175 A | * | 5/1994 | Waldman .................. 341/34 |
| 5,481,595 A | | 1/1996 | Ohashi et al. |
| 6,477,390 B1 | | 11/2002 | Gum et al. |
| 6,487,424 B1 | * | 11/2002 | Kraft et al. .................. 455/566 |

FOREIGN PATENT DOCUMENTS

| | | |
|---|---|---|
| GB | 2 402 105 | 12/2004 |
| JP | 11161406 | 6/1999 |
| JP | 2003131790 | 5/2003 |
| WO | WO 99/20029 A1 | 4/1999 |
| WO | WO 01/44912 | 6/2001 |

* cited by examiner

*Primary Examiner*—Timothy Edwards, Jr.
(74) *Attorney, Agent, or Firm*—Hollingsworth & Funk, LLC

(57) ABSTRACT

According to an aspect of the invention, an enhanced audible feedback solution has been invented for electronic devices using an input device facilitating navigation though a plurality of available user interface input options and confirmation of a selected input option. The electronic device is arranged to define, as a response to detecting a selection of a character on the basis of a detection of a first input to an input device of the electronic device, an audio segment specific to the character. The electronic device is arranged to output the defined audio segment via the audio output means prior to a confirmation by a second input to the input device, the second input being associated with a function adding the character as part of a character sequence entered by the user.

22 Claims, 2 Drawing Sheets

METHOD FOR INPUTTING CHARACTERS IN ELECTRONIC DEVICE

FIELD OF THE INVENTION

The invention relates to a method for inputting characters in an electronic device, to an electronic device, and to a computer program product.

DESCRIPTION OF THE RELATED ART

Electronic devices, such as mobile communication devices, are often used in situations where a user cannot establish or maintain visual contact to the device when using the device. Entering digits using regular keypad is error prone and slow to do in eyes-busy situation. However, dialling a phone number is still a very basic call management feature even though often most of the phone numbers are stored in mobile terminal's phonebook. The user usually has to find a correct digit by relying a tactile feedback of the keypad. Unfortunately ergonomics of many keypads does not meet the requirements of such task. Also when using a regular keypad, the user has to detach his finger from the device when selecting digits, i.e., every time after typing the number, the user has to orient his/her typing finger with respect to keypad. This usually requires glance at the keypad, if the user is not very experienced in eyes-busy usage of the device. In addition, checking the phone number is not possible without seeing it. In order to do this, the user usually needs to quickly take a glance at the display and try to accomplish the task without causing any accidents or other troubles because of losing focus from the main activity like walking or driving a car.

GB2402105 discloses a data input method for a touch screen device. The method comprises selection of a virtual key on the touch screen and confirmation of said selection: The selection occurs when the user presses down on the screen overlying the virtual key with a force exceeding a first pre-defined force and confirmation of the selection occurs when the user presses down the on the screen overlying the virtual key with a force exceeding a second pre-defined force. The step of selection of a key may be associated with various forms of feedback to clearly indicate the user that a particular key has been selected. One possibility is voice feedback: the name of a key that has just been selected could be spoken by a synthetic voice. However, the solution is limited to inputs on a touch screen operations and for providing audio feedback only identifying a key that was directly manually selected by the user. The user probably still has to establish a visual contact to the touch screen in order to focus to the correct character amongst all characters on the visual display providing no key specific tactile feedback.

There is also specific software available assisting visually impaired users to use mobile phones. This software provides audible aid for the user when the user is browsing menu items: Audio prompt provides the name of a menu when the user locates a selector to this menu. Further, entries in a call menu may be identified in a similar fashion by audible guidance, whereby an audible identification of the name of a person whose call was missed is provided to the user. The user may then select a call set-up to the currently selected and already existing contact. Messages may be entered such that the audible feedback is provided after a button has been pressed, i.e. the audible feedback is specific to the physical button and is provided only after the button has been entered. However, audible guidance is limited to these aspects.

SUMMARY OF THE INVENTION

There is now provided an enhanced solution for providing feedback to a user of an electronic device. This solution may be achieved by a method, an electronic device and a computer program product which are characterized by what is disclosed in the independent claims. Some embodiments of the invention are set forth in the dependent claims.

According to an aspect of the invention, an enhanced audible feedback solution has been invented for electronic devices using an input device facilitating navigation though a plurality of available user interface input options and confirmation of a selected input option. The electronic device is arranged to define, as a response to detecting a selection of a character on the basis of a detection of a first input to an input device of the electronic device, an audio segment specific to the character. The electronic device is arranged to output the defined audio segment via the audio output means prior to a confirmation by a second input to the input device, the second input being associated with a function adding the character as part of a character sequence entered by the user. The selection of a character is to be understood to cover a first step for adding the character as a part of the entered character sequence. For instance, if a display is applied, the selection of a character may cause a focusing of a locator on a display to the character.

According to an embodiment of the invention, the control unit is arranged to display on a display of the electronic device a list of available characters which may be navigated in horizontal or vertical direction on the basis of inputs detected to the input device. The character represented by the first input option may in a further embodiment be highlighted on the basis of the detection of the first input to the input device.

According to another embodiment of the invention, the audio segment may be created by speech synthesis or an appropriate pre-stored audio segment may be selected for the selected character.

According to an embodiment of the invention, the electronic device is arranged to select a second input option associated with an action relating to the character sequence as a response to detection of a third input to the input device. The electronic device is arranged to cause an output of an audio segment specific to the action, and the electronic device is arranged to initiate an action associated with an inputted character sequence as a response to detection of a fourth input following the third input to the input device.

The embodiments of the invention provide several advantages. Audio feedback helps to input characters to the electronic device, for instance when entering digits and making a call, while doing something else on the same time requiring main visual attention. In addition to people in eyes-busy situations this invention also helps visually impaired users to use any mobile terminal without any additional accessories.

BRIEF DESCRIPTION OF THE DRAWINGS

In the following, the invention will be described in greater detail with reference to exemplary embodiments and the accompanying drawings, in which.

DETAILED DESCRIPTION OF SOME EMBODIMENTS OF THE INVENTION

The embodiments of the invention are applicable to electronic devices, such as a mobile station used as a terminal in telecommunication systems comprising one or more base stations and terminals communicating with the base stations, for example. The device may be used for short-range communication implemented with a Bluetooth chip, an infrared or WLAN connection, for example. The electronic device is, for example, a portable telephone or another device including telecommunication means, such as a portable computer, a personal computer, a handheld computer or a smart telephone. The portable electronic device may be a PDA (Personal Digital Assistant) device including the necessary telecommunication means for establishing a network connection, or a PDA device that can be coupled to a mobile telephone, for instance, for a network connection. The portable electronic device may also be a computer, an accessory device, or a PDA device including no telecommunication means.

Figure 1:
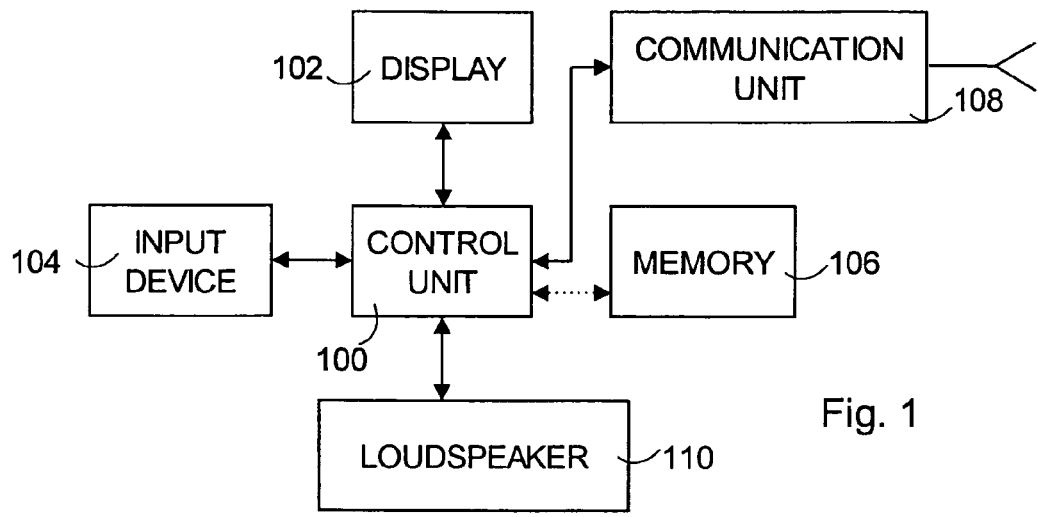
FIG. 1 shows an example of an electronic device.

FIG. 1 shows a block diagram of the structure of an electronic device. A control unit 100, typically implemented by means of a microprocessor and software or separate components, controls the basic functions of the device. A user interface of the device comprises an input device 104, audio output means including a loudspeaker 110, and a display 102. In addition, the user interface of the device may include other parts such as a microphone, a speech recognizer, a speech synthesizer, and/or a keypad part. Depending on the type of the device, there may be different and a different number of user interface parts. The device of FIG. 1, such as a mobile station, also includes communication means 108 that implement the functions of a mobile station and include speech and channel coders, modulators and RF parts. The device may also comprise an antenna and a memory 106.

The control unit 100 controls functions of the electronic device. Computer program codes executed in a processing unit of the electronic device may be used for causing the electronic device to implement the control unit 100 and in general the means for providing inventive functions relating to giving audible user feedback, some embodiments of the inventive functions being illustrated below in association with FIGS. 2, 3, and 4. A chip unit or some other kind of hardware module for controlling the electronic device may, in one embodiment, cause the device to perform the inventive functions. The hardware module comprises connecting means for connecting the electronic device mechanically and/or functionally. Thus, hardware module may form part of the device and could be removable. Some examples of such hardware module are a sub-assembly, a portable data storage medium, an IC card, or an accessory device. Computer program codes can be received via a network and/or be stored in memory means, for instance on a disk, a CD-ROM disk or other external memory means, where from they can be loaded into the memory of the electronic device. The computer program can also be loaded through a network by using a TCP/IP protocol stack, for instance. Hardware solutions or a combination of hardware and software solutions may also be used to implement the inventive functions.

Inputs from the user of the electronic device are received by means of the input device 104. The control unit 100 is connected to the display 102 and configured to control different application views on the display 102. The control unit 100 receives user input commands from the input device 104. The input device 104 receives user inputs for navigating in different operating modes of the electronic device, such as navigating in menu structures, in application views, or, as in the present embodiment, between selectable input options, shown on the display 102. The input device 104 and the control unit 100 are configured to provide navigation means for navigating though a plurality of available user interface input options and confirmation means to confirm a selected input option. The control unit 100 interprets the detected selections to the user input device 104, performs given software functions based on thereon and, as a result of the performed software functions, defines and outputs appropriate audio segments specific to the selections, and displays an updated view on the display 104. In practise, there are a plurality of specific sets of input options, which may also be referred to as available information candidates, in a specific operating mode of the electronic device. These input options may be navigated by the input device 104, i.e. currently selected or active input option may be changed for instance by pushing up/down selectors of the input device 104.

In the present embodiment, a specific user input mode may be entered in which the input device 104 may be operated to select characters and confirm addition of selected characters to form character sequences. A character specific audio segment is echoed for the user via the audio output means 110 as a response to detection of a selection of the character. In a further embodiment, such character sequences are entered to form telephone numbers by which a telephone call may be established from the electronic device. The input device 104 is not limited to any specific input methodology, but could be arranged by a virtual button on a touch-screen display or a physical button on the cover of the electronic device, for instance.

Figure 2:
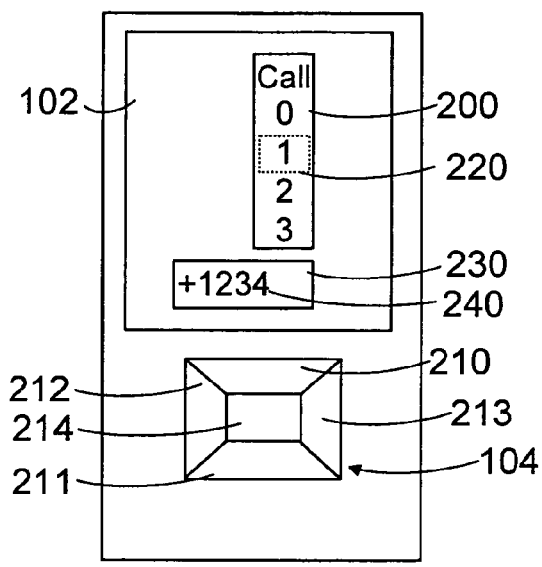
FIG. 2 illustrates an exemplary user interface of an electronic device.

FIG. 2 illustrates an embodiment in which the electronic device is arranged to provide a list 200 of available input options and the list 200 may be navigated in vertical direction. The view in display 102 represents the user input mode for adding selected and confirmed digits in the list 200 to form a character sequence 240 in block 230. Also one or more actions for the entered character sequence 240 may be selected and performed on the basis of confirmation of the action. FIG. 2 shows a selectable action input option, "Call". The electronic device is arranged to establish a call to the number in block 230 as a response to selection and confirmation of this action input option. No other keys besides the user input device 104, in the present embodiment a 5-way navigation key, is needed to complete the operation.

The input device 104 of the electronic device is a navigation key with five selectable regions or buttons 211, 212, 213, and 214 for controlling given software functions. Depending on current operating mode or state of the user interface of the electronic device, up to five operations may be associated with the input device 104.

The navigating means may be arranged by regions 210, 211 and/or 213, 214. In the present embodiment the regions 210 and 211 are associated with functions for navigating the list 200 in upward and downward directions. The control unit 100 is arranged to detect control commands indicated by the input device 104, and to detect user inputs to given navigation blocks 210 to 213. On the basis of these user inputs to navigations blocks currently associated with a navigating function, the currently selected character or action, indicated by the broken line 220, may be changed and at the same time the list view 200 may be scrolled.

In on embodiment, the input device 104 comprises a specific confirmation or selection button or a selectable region for confirmation or selection. In FIG. 2 the confirmation region 214 is in the middle of the input device 104. The confirmation region 214 is used for confirming a selected input option in the user input mode. For instance, in the example view of FIG. 2, the number "1" will be confirmed and added to the character sequence 240 being entered if the user pushes the region 214.

The appearance of the display and the form of the input device 104 may be set as desired. Different directions may be marked with individual icons, such as arrows up and down for navigation regions 210 and 211, and arrows left and right for horizontal navigation blocks 212 and 213, and crossed arrows for the control block 214. In one embodiment currently available functions of the user input device are displayed. Also appropriate colors, text, drawings or fill effects may be utilized for facilitating navigation and confirmation.

Figure 4:
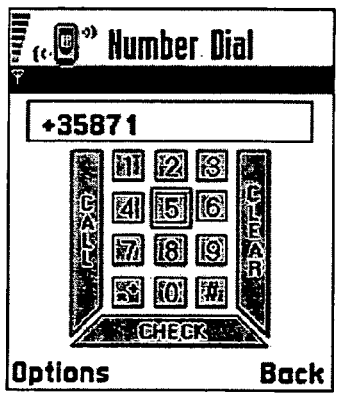
FIG. 4 illustrates a display view in accordance with an embodiment of the invention.

It is to be noted that FIG. 2 is only exemplary and the user interface may be arranged in many other ways. For instance, the list 200 may be arranged to be navigated in horizontal direction, or in horizontal and vertical direction. In one embodiment at least some of a keypad is displayed on the screen, as shown in FIG. 4. These characters (digits) and actions ("Call", "Check", and "Clear") are selected and confirmed by using the input device 104, the button with five functions of FIG. 2 is especially suitable for the embodiment of FIG. 4. It is to be noted, that it is not necessary to use graphical and visual feedback at all in an electronic device in which the present invention is implemented. The invention can be implemented in a device having no display at all, since the user is provided with audible feedback on the operations to the input device 104.

There are many implementation alternatives for the input device 104. The input device 104 may also be of any other shape than that of a square, such as a circle, for example. It is possible to apply 3-way navigation (up, down, select) key or 2-way navigation (up, down) key and a separate selection key, for instance. Another example is an 8-way navigation input device. The input device 104 may in a still another embodiment be a roller (navigation key) that may be rolled in vertical direction and/or horizontal direction to implement the navigating. Such roll may also be provided with the confirmation function, for instance by pushing the roll downwards towards the main body of the electronic device.

The control unit 100 is arranged to define, as a response to detecting a selection of a character on the basis of detection of a first navigating input causing a selection of a character or an action to a character sequence, an audio segment specific to the character or the action. The control unit 100 is arranged to cause echoing of the defined audio segment via the audio output means 110. Referring to FIG. 2, if the user pushes the button 211, the list 200 may be rolled such that the number "2" is indicated in the locator 220, and an audible representation of this number is spoken to the user.

In one embodiment audible feedback is also produced in response to detecting a confirmation of a selection of a character or an action.

The audio segments may be speech and/or non-speech audio. In one embodiment the selections of characters and actions are represented by speech output, whereby the selected character may be spoken, whereas non-speech audio feedback on confirmations of the selections is applied. Also the feedback on the characters could be provided by non-speech audio, for instance by character specific tones. A non-speech audio may be produced after the confirmation in order not to disturb the user, but still giving confirmation of the selection. However, for 'Call' command a speech prompt may be played also when confirming this action to give a clear indication that a call will be established.

In one embodiment audio segments associated with characters or actions are stored in the memory 106. The control unit 100 is arranged to retrieve an associated audio segment from the memory 106 and play the audio segment in response to detecting a navigating input selecting a character or an action. In the embodiment of FIG. 2, audio segments for at least digits and the action "Call" would be stored in the memory 106. For instance, the audio segments in the memory 106 may be indexed.

In another embodiment the electronic device is arranged to generate the audio segment by speech synthesis. In this embodiment the electronic device may comprise a speech synthesizer, not illustrated in FIG. 1. The speech synthesis may be arranged text to speech synthesis for the selected character. The control unit 100 may be arranged to supply the currently selected character (or action) to a text to speech synthesizer performing text to speech conversion. The generated audio segment is then delivered to the audio output means 110. It is possible to apply text to speech conversion systems known per se.

Figure 3:
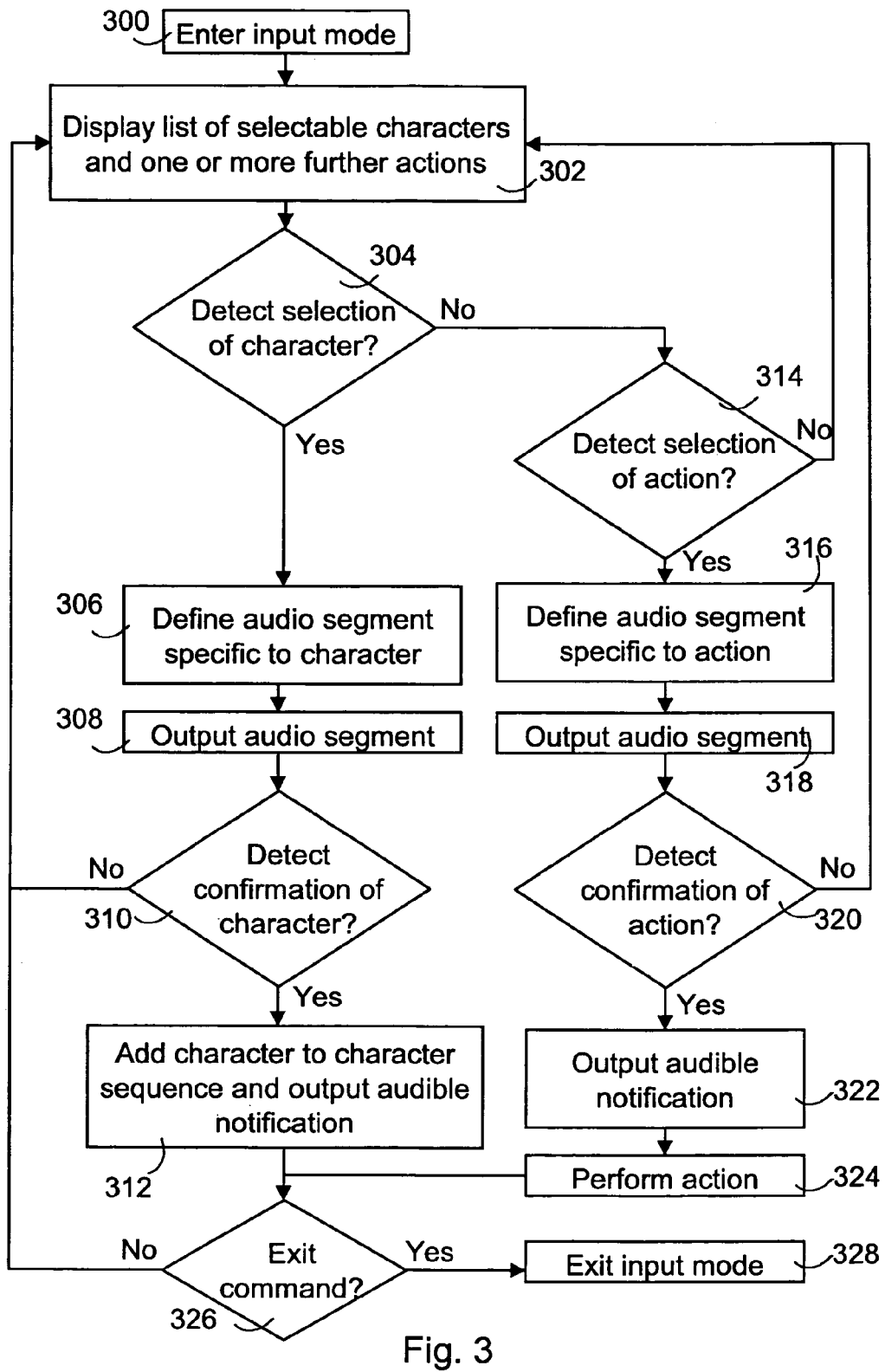
FIG. 3 shows an example of a method in accordance with an embodiment of the invention.

FIG. 3 illustrates a method according to an embodiment. In step 300 a specific input mode allowing user inputs by the input device 104 is entered. A list (200) of selectable characters and one or more further actions is displayed in step 302. Step 304 checks if a selection of a character in the list is detected. This step may be routinely carried out, or after detecting an input to the input device 104. If the selection of a character is detected, an audio segment specific to the character is defined in step 306. In step 308 the audio segment is echoed via the audio means comprising the loudspeaker 110. The control unit 100 is arranged to detect further actions to the electronic device 104, and step 310 checks if a confirmation of the selected character is detected. If not, step 302 may be returned. If the confirmation of the character is detected in step 310, in step 312 the character is added to the character sequence (240) being entered, and an audible notification is produced for the user.

Referring again to the step 304, if selection of a character was not detected on the basis of one or more user inputs to the input device 104, step 314 checks if a selection of an action is detected. If not, step 302 (or step 304) may be returned to detect user inputs to the input device 104. If the selection of an action was detected in step 314, the method proceeds to step 316 to define an audio segment specific to the detected action. Then, in step 318 the defined audio segment is echoed. In step 320 it is checked if a confirmation of the action is detected. If not, step 302 may be returned. If the confirmation is detected, an audible notification, which may be specific to the action, is echoed and in step 324 the action is performed. After steps 312 or 324 the method may check 326 if an exit command is detected. If an exit command is detected, the input mode may be ended in step 308, otherwise the method may return to step 302.

Thus, by applying the above illustrated features, as the user browses characters in the list 220 (provided as a roll), each item currently selected may be spoken out. In a further embodiment, in a situation where the user browses the list quickly enough, the electronic device is arranging the audible output only when the user stops the browsing. This embodiment may be carried out for instance by arranging the control unit 100 to apply a delay period after detecting an input. After the delay period, if there have been no further navigating inputs, the control unit 100 may continue by defining the appropriate audio segment specific to the selected character. In that case only the current item under focus is spoken out.

The display 102 may be updated on the basis of the detected input, illustrated by the return to step 302 in FIG. 3. In one embodiment the current position of a selector on a display 102 of the electronic device is updated to show the currently selected character or an action. This updating may be carried out after positive check in step 304 or 314, for instance. For instance, the currently selected character or action may be highlighted. Also the confirmation of the character or the action may be indicated in the display 102 after step 310 or 320.

There are many actions that may be performed (step 324 in the embodiment of FIG. 3) for or on the basis of the character sequence 240 selected and confirmed by the user. For instance, at least some of the following actions may be applied: establish a call to a party represented by the character sequence, clear at least one character from the character sequence, provide audio feedback of the characters currently included in the character sequence, transmit the character sequence, copy the character sequence, store the character sequence, add a special character not available by the input options currently available by the input device, exit from the current input mode.

In one embodiment an action for removing digits may be selected and activated by the input device 104. This available user input option is also illustrated in FIG. 4. When the user removes entered digits or characters, the electronic device may produce a non-speech sound. This could also be a speech prompt, but for information clarity a non-speech sound is enough. However, a speech prompt may be given when the user has removed all characters, since it is not possible to make a further action, such as a call, anymore.

Referring to the example in FIG. 2, the removal of the last entered character from the entered phone number may be associated with the left direction in the navigation control of the input device 104, i.e. the segment 212. However, also other configurations may be used, and other functions may be associated with the regions 212 and 213. Entered phone number is like a stack and entering new elements or removing them is arranged in LIFO (Last-in/First-out) order.

In one embodiment an action for checking the inputted character sequence 240 is one available user input option that may be selected and activated by the input device 104. This input option is also illustrated in FIG. 4, "CHECK". As a response to confirmation of this checking input option, the electronic device is arranged to produce an audio output of all characters currently present in the character sequence 240. For instance, when the user wants to check an entered phone number sequence, the numbers are spoken out one by one, or possibly as groups. The control unit 100 may apply pre-stored audio segments in the memory 106 also for this purpose. By this embodiment the user may easily check an inputted character sequence such as a phone number without seeing it.

In a further embodiment the control unit 100 is arranged to turn the roll 200 automatically to have a focus on 'Call' command after checking the number, because it is more probable for an experienced user to make a call after the number is checked than to continue entering more number or deleting the entered one(s).

In one embodiment, audible representation of a further character sequence associated with the entered character sequence 240 may be provided for the user. For instance, a name associated in a contact list to a number in the character sequence 240 may be spoken to the user. In one further embodiment this feature is applied when the action for establishing a call or the action for checking the character sequence is confirmed.

Referring to the example in FIG. 2, the checking action may be associated with the right direction in the navigation control, i.e. to the segment 213. In an alternative embodiment the remove and check actions are added to the roll. However, with only three-way navigation (up, down and select) or two-way navigation and a separate selection key, those two commands could be used in the roll. Also the navigation direction can be different.

In one embodiment additional instructions are spoken to the user. For example, if the user has entered a phone number, which is somehow wrong (illegal format), a warning message may be spoken.

As already illustrated, the characters entered by operating the input device 104 may include digits and other related characters, such as "+" for telephone numbers. However, the invention may be applied also for other characters and purposes. For instance, at least some of the above illustrated features related to providing the audible feedback to the operations made by an input device may be provided for a text input mode, where the user selects and confirms letters and numerals to form words. For instance, the input mode could be a message-editing mode.

In one embodiment, audible feedback on already inputted characters in the character sequence, such as the sequence 240 in FIG. 2, is automatically outputted, instead of using a specific selection input option as illustrated above. In other words, the electronic device is configured to define and output an audio segment representing at least a portion of the characters confirmed in the input mode. For instance, speech feedback representing a character sequence forming a word is outputted. This embodiment may be applied in addition or instead of the audible output specific to the selected character, for instance in steps 306 and 308 of FIG. 3, and/or after a confirmation of a character has been detected, i.e. in step 312 of the embodiment in FIG. 3. An advantage of the embodiment of providing automatic audible feedback on inputted character sequence include is it errors may be reduced. The former option may be helpful for the user on deciding whether to confirm addition of a selected character to the inputted character sequence. In the latter option the user then obtains information on the whole character sequence inputted so far without having to specifically select any checking input option.

In a further another embodiment, an audio segment representing an inputted character sequence is outputted in connection with selection and/or confirmation of a selection related to the inputted character sequence. This action may be performed instead or in addition to defining and outputting an audio segment specific to the action or an audible notification for the confirmation of the action. For instance, the electronic device may be configured to define, in step 316 and/or after positive answer in step 320, an audio segment representing all or some of the inputted character sequence and output such audio segment in step 318 and/or 322 in addition to the audio segment specific to the action. An example is that the electronic device outputs speech representation of "Calling" and the dialled number "1234567" in step 322.

Above illustrated audio output and generation techniques may be applied also for generating audible output of the already inputted character sequence; already stored audio segments may be retrieved from the memory 106 or speech synthesis may be used.

In one embodiment, audible representation is specifically arranged for a character sequence representing a word separated from other words by a separating character such as a space or a punctuation mark. When such separating character is (confirmed to be) inserted from the character list 200, an audio segment representing the produced word (i.e. the text between the space mark and the previous space mark, punctuation mark or text buffer beginning) is defined and outputted to the user. As already illustrated, such audible representation of the word could be outputted in step 308 and/or 312 of the embodiment in FIG. 3. The character list 200 may also include control characters, such as erase ("delete") and end of text ("EOF" a.k.a end-of-file code).

A reference is again made to exemplary input device 104 of FIG. 2 providing at least 5 operations (UP, DOWN, LEFT, RIGHT, SELECT) by buttons 210 to 214, respectively. As already mentioned, these five operations can be used for following actions: UP—scroll the list 200 of characters towards the beginning; DOWN—scroll the list 200 of characters towards the end; SELECT—insert a character in focus to the end of the text buffer 230; LEFT—progress towards the beginning of the text buffer; RIGHT—progress towards the end of the text buffer 230. As the character list 200 is being scrolled, each character is read out by a human-like synthetic voice with each step of progression. In a further embodiment, when the text buffer 230 is being scrolled by LEFT and RIGHT buttons 212, 213, the words (character strings between punctuation characters) are read out.

In an alternative embodiment, the input device 104 or the key can be a joystick, or some other type of 5-operation control device. The LEFT-press (212) can also act as the delete, where an IN-press (214) will switch modes between text buffer scrolling and character input. In this implementation, the characters may be inserted by the RIGHT-press (213) when text input mode is active. The active status is toggled by the SELECT-press. When text input mode is not active, LEFT- and RIGHT-presses 212, 213 may be configured to cause scrolling the text buffer word by word, and DOWN- and UP-presses 211, 210 may be configured to offer some supporting actions, such as selections to save, send or delete the text.

Figure 5:
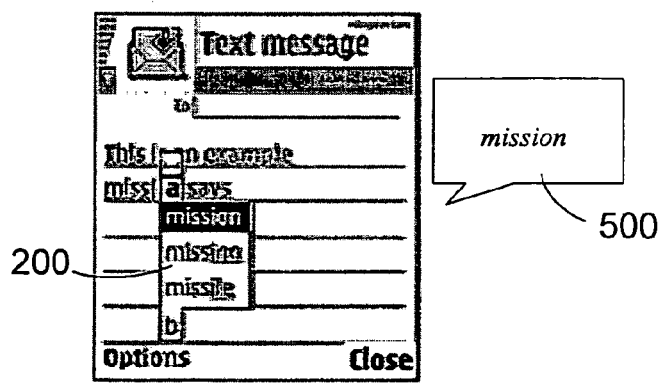
FIG. 5 illustrates a display view in accordance with an embodiment of the invention.

In one embodiment, the text input controller (100) is provided by a word-end predictor presenting a list of possible or predicted words based on the characters inputted so far (past a punctuation mark or space as already mentioned). These words may be included in the list 200 of characters, as shown in the FIG. 2, and, while the list is scrolled, the words will be read out by the synthetic voice. In one embodiment illustrated in FIG. 5 the list 200 is supplemented by the predicted words. Alternatively, a supplementing list or other type of additional window may be opened in current display view for showing the suggested words. In a further embodiment, an audio segment representing a predicted word may be outputted to the user, illustrated by box 500. This embodiment further helps the user for selecting appropriate characters.

Above illustrated various embodiments provide many advantages. The audible feedback on characters or character sequences facilitates finding the right key to press and may even be an alternative for speech recognition where the user is able to operate the device but without looking the device. In the embodiment illustrated in connection with FIGS. 2 and 3, the user could by operating the 5-key input device 104 easily browse through available characters and confirm selection of appropriate ones based on the audible feedback, without requiring to look at the device or specifically finding keys in a keypad. If compared with speech recognition, speech output providing audible feedback for selected and/or confirmed characters is technically and computationally less demanding than complete speech recognition system, thus allowing for less powerful and thereby cheaper, smaller, and less power-hungry technology inside the electronic device. Further, error corrections of speech recognition systems requiring visual attention are not needed.

Use cases for above illustrated embodiments include: a minimally sized device that has no keypad or display; a regular device that is being used in a visually demanding situation where the focus cannot be shifted often or long enough to the display and keypad (driving, walking in a hurry, monitoring and surveillance work, for instance). However, it is to be noted that the application of the present invention is not limited to any specific device or application type.

Even though the invention has been described above with reference to an example according to the accompanying drawings, it is clear that the invention is not restricted thereto but can be modified in several ways within the scope of the appended claims.

The invention claimed is:

1. An electronic device comprising a control unit for controlling functions of the electronic device, audio output, and a user input device for navigating through a plurality of available user interface input options and for confirming a selected input option, wherein the electronic device is configured to detect selection of a first input option on the basis of a first input to the input device and confirm the first input option as a response to detection of a second input to the input device, the first input option representing a character and the second input being associated with a function for adding the character as part of a character sequence entered by the user, the control unit is configured to define, as a response to detecting a selection of the character on the basis of the detection of the first input to the input device, an audio segment specific to the character, the control unit is configured to cause an output of the defined audio segment via the audio output prior to the confirmation, the control unit is configured to select a second input option associated with an action relating to the character sequence as a response to detection of a third input to the input device, the control unit is configured to cause an output of an audio segment specific to the action, and the control unit is configured to initiate an action associated with an inputted character sequence as a response to detection of a fourth input following the third input to the input device.

2. An electronic device as claimed in claim 1, wherein the control unit is configured to display on a display of the electronic device a list of available characters which may be navigated in horizontal and/or vertical direction on the basis of inputs detected to the input device, and the control unit is configured to highlight the character represented by the first input option on the basis of the detection of the first input to the input device.

3. An electronic device as claimed in claim 1, wherein the input device is a multi-operation navigation key, whereby the control unit is configured to detect the first input to one of the following navigating regions by the navigation key, at least two of which are available in the button for navigating: up, down, left, right, and the control unit is configured to detect the second input to a specific confirmation button or to a portion of the navigation key associated with the confirmation of the first input option currently selected.

4. An electronic device as claimed in claim 1, wherein the audio segment is stored in the memory and associated with the character, and the control unit is configured to retrieve the audio segment from the memory and play the audio segment in response to detecting the first input.

5. An electronic device as claimed in claim 1, wherein the electronic device is configured to generate the audio segment by speech synthesis.

6. An electronic device as claimed in claim 1, wherein the action is one of the following: establish a call to a party represented by the character sequence, clear at least one character from the character sequence, providing audio feedback of the characters currently included in the character sequence, transmit the character sequence, copy the character sequence, store the character sequence, add a special character not available by the input options currently available by the input device, exit from a current input mode.

7. An electronic device as claimed in claim 1, wherein the electronic device is a mobile communications device and the characters selectable to the character sequence include digits, and the electronic device is configured to establish a call to a party represented by the character sequence.

8. A method for character input in an electronic device, the method comprising:

detecting selection of a first input option on the basis of a first input to an input device, the first input option being confirmable as a response to detection of a second input to the input device, the first input option representing a character and a second input being associated with a function adding the character as part of a character sequence entered by a user, defining, as a response to detecting a selection of the character on the basis of the detection of the first input to the input device, an audio segment specific to the character, wherein the defined audio segment is echoed via audio output prior to the confirmation, selecting a second input option associated with an action relating to the character sequence as a response to detection of a third input to the input device, echoing an audio segment specific to the action, and initiating an action associated with an inputted character sequence as a response to detection of a fourth input following the third input to the input device.

9. A method according to claim 8, wherein the action is one of the following: establish a call to a party represented by the character sequence, clear at least one character from the character sequence, providing audio feedback of the characters currently included in the character sequence, transmit the character sequence, copy the character sequence, store the character sequence, add a special character not available by the input options currently available by the input device, exit from a current input mode.

10. A method according to claim 8, wherein a list of available characters, which may be navigated in horizontal and/or vertical direction is displayed on a display of the electronic device on the basis of inputs detected to the input device, and the character represented by the first input option is highlighted on the basis of the detection of the first input to the input device.

11. A method according to claim 8, wherein the input device is a multi-operation navigation key, whereby the first input is detected to one of the following navigating regions by the navigation key, at least two of which are available in the button for navigating: up, down, left, right, and the second input is detected to a specific confirmation button or to a portion of the navigation key associated with the confirmation of the first input option currently selected.

12. A method according to claim 8, wherein the audio segment is stored in a memory and associated with the character, and the audio segment is retrieved from the memory and played in response to detecting the first input.

13. A method according to claim 8, wherein the audio segment is generated by speech synthesis.

14. A method according to claim 8, wherein the electronic device is a mobile communications device and the characters selectable to the character sequence include digits, and a call is established to a party represented by the character sequence.

15. A computer program product operable on a processor of an electronic device comprising a user input device for navigating through a plurality of available user interface input options and for confirming a selected input option, the computer program product comprising:

computer program code for defining, as a response to detecting a selection of a character on the basis of detection of a first input to the input device, an audio segment specific to the character, computer program code for causing output of the defined audio segment via audio output prior to a confirmation of the character for adding the character as part of a character sequence, the character being confirmed as a response to detection of a second input to the input device, computer program code for selecting a second input option associated with an action relating to the character sequence as a response to detection of a third input to the input device, computer program code for causing output of an audio segment specific to the action, and computer program code for initiating an action associated with an inputted character sequence as a response to detection of a fourth input following the third input to the input device.

16. A computer program product according to claim 15, wherein the action is one of the following: establish a call to a party represented by the character sequence, clear at least one character from the character sequence, providing audio feedback of the characters currently included in the character sequence, transmit the character sequence, copy the character sequence, store the character sequence, add a special character not available by the input options currently available by the input device, exit from a current input mode.

17. A user interface for an electronic device, wherein the user interface is configured to detect selection of a first input option on the basis of a first input to an input device, confirm the first input option as a response to detection of a second input to the input device, the first input option representing a character and a second input being associated with a function for adding the character as part of a character sequence entered by the user, cause audio output of an audio segment specific to the character prior to the confirmation, the audio segment being defined in response to detecting a selection of the character on the basis of the detection of the first input to the input device, detect selection of a second input option associated with an action relating to the character sequence as a response to detection of a third input to the input device, cause an output of an audio segment specific to the action, and initiate an action associated with an inputted character sequence as a response to detection of a fourth input following the third input to the input device.

18. A user interface according to claim 17, wherein the user interface is configured to display a list of available characters which may be navigated in horizontal and/or vertical direction on the basis of inputs detected to the input device, and to highlight the character represented by the first input option on the basis of the detection of the first input to the input device.

19. A user interface according to claim 17, wherein the action is one of the following: establish a call to a party represented by the character sequence, clear at least one character from the character sequence, providing audio feedback of the characters currently included in the character sequence, transmit the character sequence, copy the character sequence, store the character sequence, add a special character not available by the input options currently available by the input device, exit from a current input mode.

20. An electronic device comprising:
   means for detecting selection of a first input option on the basis of a first input to an input device,
   means for confirming the first input option as a response to detection of a second input to the input device, the first input option representing a character and the second input being associated with a function for adding the character as part of a character sequence entered by a user,
   means for defining, as a response to detecting a selection of the character on the basis of the detection of the first input to the input device, an audio segment specific to the character,
   means for causing an audio output of the defined audio segment prior to the confirmation,
   means for selecting a second input option associated with an action relating to the character sequence as a response to detection of a third input to the input device,
   means for causing an output of an audio segment specific to the action, and
   means for initiating an action associated with an inputted character sequence as a response to detection of a fourth input following the third input to the input device.

21. An electronic device according to claim 20, wherein
   the electronic device is configured to display on a display of the electronic device a list of available characters which may be navigated in horizontal and/or vertical direction on the basis of inputs detected to the input device, and
   the electronic device is configured to highlight the character represented by the first input option on the basis of the detection of the first input to the input device.

22. An electronic device according to claim 20, wherein the action is one of the following: establish a call to a party represented by the character sequence, clear at least one character from the character sequence, providing audio feedback of the characters currently included in the character sequence, transmit the character sequence, copy the character sequence, store the character sequence, add a special character not available by the input options currently available by the input device, exit from a current input mode.

* * * * *